United States Patent Office 3,190,886
Patented June 22, 1965

3,190,886
2,5-DIARYL-1,2,3,4,5,6-HEXAAZAPENTALENES
Rudolph A. Carboni, Wilmington, Del., assignor to E. I. du Pont de Nemours and Company, Wilmington, Del., a corporation of Delaware
No Drawing. Filed Apr. 10, 1963, Ser. No. 271,872
5 Claims. (Cl. 260—308)

This invention has as its principal objects the provision of a new class of compounds, namely, 2,5-diaryl-1,2,3,4,5,6-hexaazapentalenes, and a method for their preparation.

The 2,5-diaryl-1,2,3,4,5,6-hexaazapentalenes of this invention have the formula (I) 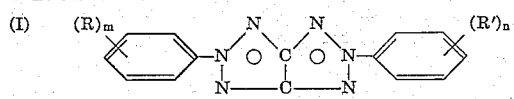

wherein each R and R' represents nitro, sulfo ($HSO_3^-$), hydroxy, chloro, bromo, acetamido, amino or dialkylamino wherein the alkyl groups contain 1–6 carbons, $m$ and $n$ are cardinal numbers of 0 to 4, and the circles inscribed within the triazole rings indicate resonance-stabilized structures. It is to be understood that R and R' as well as the R's on each phenyl moiety may be the same or different.

Compounds of the above formula which contain at least 2 nitro groups constitute a preferred subclass of products. It is also preferred that $m$ plus $n$ not exceed 5.

The 2,5-diaryl-1,2,3,4,5,6-hexaazapentalenes of this invention are colored high-melting crystalline solids which absorb ultraviolet light and are soluble in ordinary solvents. Also, they are thermally stable and are hydrolytically inert. The hexaazapentalenes of this invention have typical aromatic properties in that their polynitrogen ring system is not broken by strong electrophilic reagents such as nitric or sulfuric acid. The stability and aromaticity of 2,5-diaryl-1,2,3,4,5,6-hexaazapentalenes is attributable to their resonance-stabilized mesoionic structure which can be represented as follows:

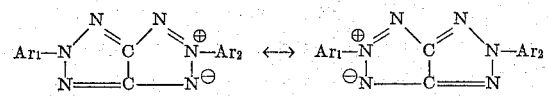

wherein $Ar_1$ and $Ar_2$ represent the aryl groups

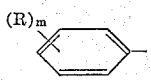

and

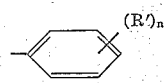

respectively.

Representative 2,5-diaryl-1,2,3,4,5,6-hexaazapentalenes of this invention are those wherein the $Ar_1$ and $Ar_2$ moieties are phenyl, nitrophenyl (o, m or p), dinitrophenyl (e.g., 2,4-dinitrophenyl), hydroxyphenyl (o, m or p) or one of its chloro, bromo, sulfo or nitro derivatives, m-dihydroxyphenyl, chlorophenyl (o, m or p), dichlorophenyl (e.g., 3,5-dichlorophenyl), bromophenyl (o, m or p), aminophenyl (o, m or p), diaminophenyl (e.g., 2,5-diaminophenyl), sulfophenyl (o, m or p), disulfophenyl (e.g., 2,4-disulfophenyl), acetamidophenyl or one of its chloro, bromo, sulfo or nitro derivatives, or an N,N-dialkylaminophenyl group (e.g., N,N-dimethylaminophenyl, N,N-diethylaminophenyl and N,N-dihexylaminophenyl) or one of its chloro, bromo, sulfo or nitro derivatives.

Compounds of Formula I wherein R and R' are nitro, sulfo, hydroxy, chloro, bromo, acetamido or dialkylamino, with the proviso that at least one R' is hydroxy, dialkylamino or acetamido, may be prepared by the following sequence of reactions:

A. 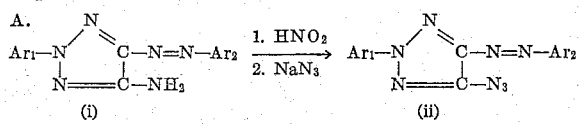

and

B. 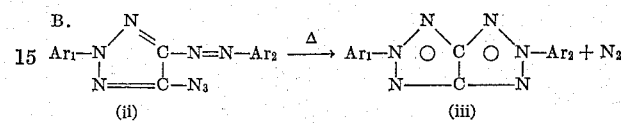

In part 1 of step A, a 5-amino-2-aryl-4-arylazo-2H-triazole, compound (i), is diazotized with nitrous acid under conventional diazotization conditions (cf., Lucas and Pressman, "Principles and Practice in Organic Chemistry," John Wiley and Sons, New York, 1949, Chapter 34). The resulting diazonium salt is then reacted with an alkali metal azide, preferably sodium azide, under acid conditions at a temperature that is preferably below 20° C., generally 0–10° C., to give the corresponding 5-azido-2-aryl-4-arylazo-2H-triazole, compound (ii).

Step B comprises thermally decomposing azido compound (ii) to give the desired 2,5-diaryl-1,2,3,4,5,6-hexaazapentalene, compound (iii), and two atoms of nitrogen. This step constitutes one embodiment of this invention.

The decomposition temperature will vary depending on the particular azido triazole employed and its purity. The appropriate temperature is easily determined by gradually heating the azido derivative to successively higher temperatures until nitrogen evolution occurs. Generally, the azido compound will decompose at a temperature between about 15° C. and 200° C. When the azido compound is in pure form, i.e., as obtained from the product mixture of step A by fractional recrystallization, it will decompose at about 100° C. or above. Preferably, the azido derivative is dissolved in an inert hydrocarbon or halohydrocarbon solvent, e.g., benzene, chlorobenzene or o-dichlorobenzene, in which event appreciable decomposition will occur at 50–75° C., with more practical rates of decomposition occurring at 140–180° C. The temperature at which a given azido triazole will decompose to give the desired compound of Formula (iii) can be lowered by subjecting it to the influence of ultraviolet radiation.

The starting materials for step A, i.e., the 5-amino-2-aryl-4-arylazo-2H-triazoles of Formula (i) are prepared from aryl hydrazines by the method of Thiele et al., Ann. 295, 129 (1897), which is schematically represented as follows:

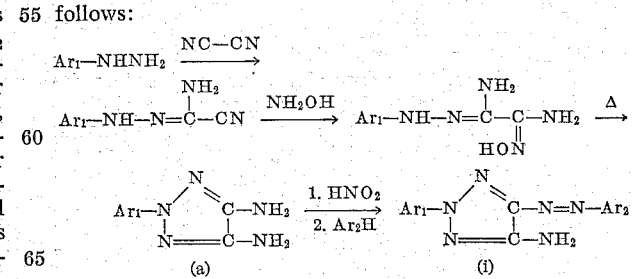

wherein $Ar_1$ and $Ar_2$ are as defined for steps A and B.

The starting materials of Formula (i) can also be prepared from intermediate (a) by the following steps:

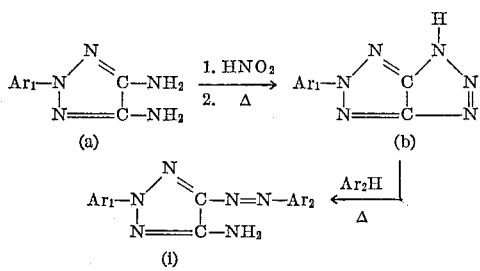

Conversion of intermediate (a) to intermediate (b) is taught by Thiele et al., supra, and the coupling of (a) with Ar₂H to give starting material (i) is illustrated in Example 2. As shown in Example 3, diazotization of intermediate (a) with nitrous acid, i.e., the first step in the above equation, followed by reaction of the diazonium salt with sodium azide, yields 2-phenyl-4-amino-5-azido-2H-triazole,

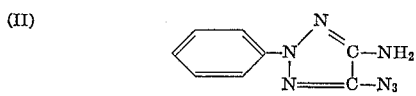

a heretofore unknown intermediate which constitutes another aspect of this invention. This intermediate can be diazotized with nitrous acid and then coupled with an Ar₂H compound (e.g., dimethylaniline), as in the last two steps of the Thiele method described above, to give a compound of Formula (ii) which can be thermally decomposed according to step B to give a 2-phenyl-5-Ar₂-1,2,3,4,5,6-hexaazapentalene of this invention.

2,5-diaryl-1,2,3,4,5,6-hexaazapentalenes of this invention wherein at least one R or R' is amino (—NH₂) are prepared by one of the following conventional techniques: (1) by hydrolyzing a compound of Formula I wherein at least one of R or R' is acetamido or (2) by hydrogenating a compound of Formula I, wherein at least one of R or R' is nitro, in the presence of tetrahydrofuran and a platinum oxide catalyst.

Compounds of Formula I wherein neither R nor R' is acetamido or amino are prepared by converting the corresponding acetamido compound of Formula I, prepared by steps A and B, supra, to the corresponding amino derivative by hydrolysis and then subjecting the latter to well-known diazotization and reduction steps to replace the amino group(s) with hydrogen (cf. Lucas and Pressman, supra). 2,5-diphenyl-1,2,3,4,5,6-hexaazapentalene is prepared by this procedure, e.g., by starting with 4-(p-acetamidophenylazo)-5-amino-2-phenyl-2H-triazole in step A of the process described above.

Compounds of Formula I wherein R and/or R' are chloro, bromo, sulfo or nitro can be prepared either by the direct two-step method described above or by treating 2,5-diphenyl-1,2,3,4,5,6-hexaazapentalene or one of its R or R' derivatives with electrophilic reagents by conventional techniques. For example, chloro and bromo derivatives can be obtained by direct halogenation with elemental chlorine or bromine in the presence of a catalyst such as ferric chloride and iodine; nitro derivatives can be prepared by nitration with nitric acid or aqua regia; and sulfo derivatives can be obtained by treatment with chlorosulfonic acid at 75°–125° C. Such electrophilic substitutions can be performed step-wise to give products having a combination of different substituents.

The following examples further illustrate the process and products of this invention.

EXAMPLE 1

A. 4-[p-(dimethylamino)phenylazo]-5-azido-2-phenyl-2H-triazole

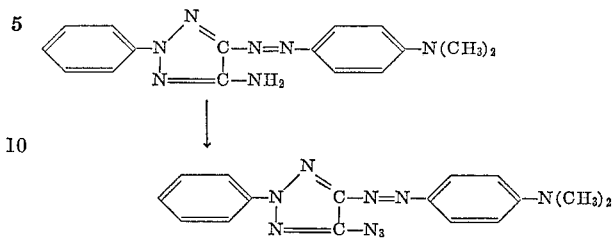

A solution of 0.5 g. of sodium nitrite in 5 ml. of water was added dropwise to a stirred suspension of 0.5 g. of 4-[p-(dimethylamino)phenylazo]-5-amino-2-phenyl - 2H-triazole in a cold mixture of 5 ml. of concentrated hydrochloric acid and 20 ml. of water. The mixture became deep blue-green in color, with formation of a colored solid. The colored mixture was stirred for 30 minutes, and then a solution of 0.7 g. of sodium azide in 5 ml. of water was added dropwise. Gas evolution and discharge of the deep color occurred in this step. After being stirred an additional 30 minutes, the reaction mixture was filtered; and the solid yellow product in the filter was washed with water and air-dried. The product was purified by recrystallization in hexane, and was identified as 4-[p-(dimethylamino)phenylazo]-5-azido-2-phenyl-2H-triazole.

Anal. for $C_{16}H_{15}N_9$:

|        | C    | H    |
|--------|------|------|
| Calc'd | 57.7 | 4.54 |
| Found  | 58.5 | 4.79 |

B. 2-phenyl-5-[p-(dimethylamino)phenyl]-1,2,3,4,5,6-hexaazapentalene

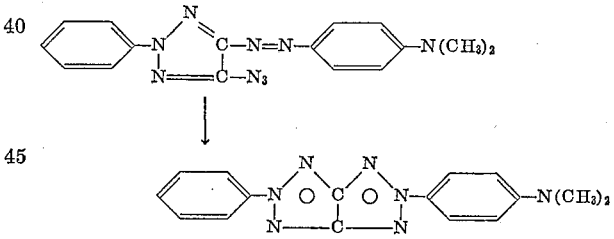

A solution of 1.3 g. of the azido derivative, prepared as in part A, in 12 ml. of o-dichlorobenzene was heated at reflux for 1.5 hours and then cooled. A crop of crystals (0.4 g.) was collected by filtration and washed with hexane. The filtrate was distilled to remove dichlorobenzene, and the residue was extracted with benzene. Dilution of the deep orange-red benzene solution with four volumes of pentane caused precipitation of an additional amount (0.45 g.) of the crystalline product, which was collected by filtration and combined with the first crop. The crystalline product was then purified by slow sublimation at 210–230° C. and 0.15 mm. pressure. The purified product melted at 285–286.5° C., and was identified as 2-phenyl-5-[p - (dimethylamino)phenyl] - 1,2,3,4,5,6 - hexaazapentalene.

Anal. for $C_{16}H_{15}N_7$:

|        | C    | H    | N    |
|--------|------|------|------|
| Calc'd | 62.9 | 4.95 | 32.1 |
| Found  | 62.7 | 4.95 | 32.1 |

The ultraviolet spectrum showed peaks at 422 mμ (ε=33,280) and at 304 mμ (ε=13,160).

The 4-[p-(dimethylamino)phenylazo]-5-amino-2-phenyl-2H-triazole employed as the starting material in part A of the preceding example was also prepared alternatively, as follows:

EXAMPLE 2

*4-[p-(dimethylamino)phenylazo]-5-amino-2-phenyl-2H-triazone*

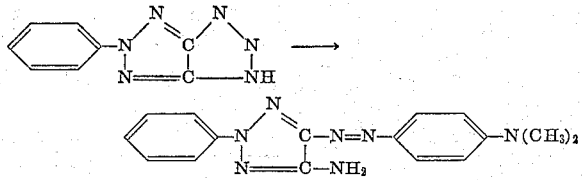

Slightly more than the stoichiometric amount (0.33 g.) of N,N-dimethylaniline was added to a warm solution of 0.5 g. of 1,5-dihydro-5-phenyl-v-triazolo[4,5-d]-v-triazole in 10 ml. of acetic acid. The mixture was refluxed for 1 hour, then kept at room temperature overnight. A red solid was separated by filtration and identified as 4-[p-(dimethylamino)phenylazo]-5-amino-2-phenyl-2H - triazole by its infrared absorption spectrum.

EXAMPLE 3

*2-phenyl-4-amino-5-azido-2H-triazole*

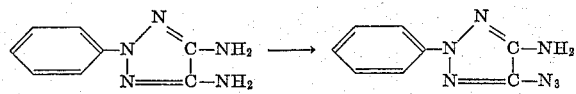

A solution of 1.0 g. of 2-phenyl-4,5-diamino-2H-triazole in 40 ml. of 0.625 percent aqueous hydrochloric acid was added dropwise to a cold (0–5° C.) stirred solution of 0.8 g. of sodium nitrite in 60 ml. of water containing 4 ml. of concentrated hydrochloric acid. The ensuing mixture was filtered, the yellow filtrate was treated with 0.4 g. of urea to destroy excess nitrous acid, and a solution of 0.37 g. of sodium azide in water was added. A yellow solid was formed, with gas evolution from the mixture. The product (0.74 g.) was collected, washed with water and air-dried on a filter. The infrared spectrum was consistent with the assigned structure for 2-phenyl-4-amino-5-azido-2H-triazole.

EXAMPLE 4

*Dinitro derivative of 2-phenyl-5-[p-(dimethylamino)-phenyl]1,2,3,4,5,6-hexaazapentalene*

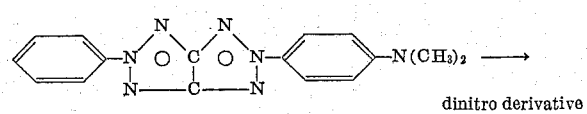

A solution of 60 mg. of 2-phenyl-5-[p-(dimethylamino)phenyl]1,2,3,4,5,6-hexaazapentalene in 1.5 ml. of 90% nitric acid was prepared at room temperature. After one minute the amber solution was poured onto 5 g. of crushed ice, and when the ice had melted the solid product was separated and washed with water on a filter. The air-dried red-brown product weighed 80 mg. It was extracted with boiling acetone, vacuum-dried, and identified as a dinitro derivative (M.P. 335° C.) of 2-phenyl-5-[p-(dimethylamino)phenyl]-1,2,3,4,5,6-hexaazapentalene.

Anal. for $C_{16}H_{13}N_9O_4$:

|  | C | H | N |
|---|---|---|---|
| Calc'd | 48.6 | 3.32 | 31.9 |
| Found | 48.6 | 3.68 | 31.5 |
|  | 48.4 | 3.55 |  |

The infrared spectrum showed prominent peaks at 1341 and 1530 cm.$^{-1}$, indicative of nitro substituents. The ultraviolet spectrum (dioxane solution) exhibited absorption maxima at 308 and 418 m$\mu$.

EXAMPLE 5

*Tetranitro derivative of 2-phenyl-5-[p-(dimethylamino)-phenyl]-1,2,3,4,5,6-hexaazapentalene*

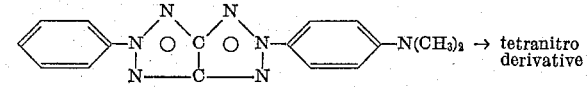

A solution of 90 mg. of 2-phenyl-5-[p-(dimethylamino)phenyl]-1,2,3,4,5,6-hexaazapentalene in 2.0 ml. of 90% nitric acid was quickly heated to 70° C. and then poured onto 10 g. crushed ice. The resultant precipitate was separated, washed with water and air-dried on a filter. The yellow solid (100 mg.) was recrystallized in a mixture of 8 ml. of acetone and 10 ml. of hexane. The purified product, M.P. 221–221.6° C., was identified as a tetranitro derivative of 2-phenyl-5 - [p - (dimethylamino)-phenyl]-1,2,3,4,5,6-hexaazapentalene.

Anal. for $C_{16}H_{11}N_{11}O_8$:

|  | C | H | N |
|---|---|---|---|
| Calc'd | 39.6 | 2.29 | 31.75 |
| Found | 39.6 | 2.60 | 31.0 |
|  | 39.6 | 2.55 | 31.1 |

Infrared absorption at 1342 and 1550 cm.$^{-1}$ verified the presence of nitro substituents. The ultraviolet spectrum exhibited absorption maxima at 357 m$\mu$ ($\epsilon$=53,500) and 350 m$\mu$ ($\epsilon$=52,000).

When 2-phenyl-5-[p-(acetamido)phenyl] - 1,2,3,4,5,6-hexaazapentalene is substituted for 2-phenyl-5-[p-(dimethylamino)phenyl]-1,2,3,4,5,6-hexaazapentalene in the process of the above example, the corresponding tetranitro derivative is obtained. This derivative can be converted to the tetranitro derivative of 2,5-diphenyl-1,2,3,4,5,6-hexaazapentalene by hydrolyzing the acetamido group and then replacing the resulting amino group with hydrogen by conventional diazotization-reduction techniques.

All compounds of the formula

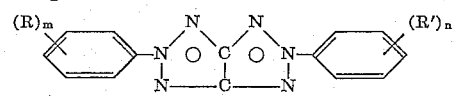

where R and R' are nitro, sulfo, —OH, chloro, bromo, acetamido or dialkylamino, with the proviso that at least one R' is —OH, dialkylamino or acetamido, are prepared by the process of Example 1 simply by substituting the corresponding 5-amino-2-aryl-4-arylazo-2H-triazole for 4-[p-(dimethylamino)phenylazo]-5-amino-2-phenyl - 2H-triazole in part A. For example, when 4-[p-(acetamido)-phenylazo]-5-amino-2H-phenyl-2H-triazole is thus substituted, 2-phenyl-5 - [p - (acetamido)phenyl] - 1,2,3,4,5,6-hexaazapentalene is readily prepared. This compound can, in turn, be reacted with an electrophilic reagent (e.g., by the process of Example 5) and/or the acetamido group can be hydrolyzed to amino, which can, if desired, be removed by conventional diazotization-reduction techniques to give 2,5-diphenyl - 1,2,3,4,5,6 - hexaazapentalene. Of course, the latter compound can be reacted with electrophilic reagents to give other compounds of this invention.

2,5,-diaryl-1,2,3,4,5,6-hexaazapentalenes having an absorption maxima of 300–450 m$\mu$ are useful for absorption of ultraviolet light, e.g., in light filters. Also, the compounds of this invention are useful as coloring agents for films and fabrics (wool, cellulose acetate, glycol-terephthalic acid polyester) as illustrated by the following example.

EXAMPLE A

A solution of 5 mg. of 2-phenyl-5-[p-(dimethylamino)-phenyl]-1,2,3,4,5,6-hexaazapentalene in 2 ml. of N,N-dimethylformamide was added to 11 ml. of hot distilled water containing a drop of a detergent solution. Small swatches (3 sq. cm.) of undyed cellulose acetate and Dacron ® fabrics were placed in the aqueous mixture, and the assemblage was heated at 95–100° C. for one hour. The swatches were removed, washed thoroughly with soap and water, rinsed and air-dried. The ecellulose acetate fabric was yellow-orange in color, and the Dacron ® fabric was a bright canary yellow.

Since various modifications and equivalents in the invention will be evident to those skilled in the chemical arts, I propose to be bound solely by the appended claims.

The embodiments of the invention in which an exclusive property or privilege is claimed are defined as follows:

1. A compound of the formula

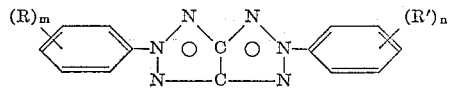

wherein each R and R' represents a member of the group consisting of nitro, sulfo, hydroxy, chloro, bromo, acetamido, amino and dialkylamino having alkyl groups of 1–6 carbons, $m$ and $n$ are cardinal numbers of 0 to 4, and the circles inscribed within the triazole rings represent resonance-stabilized structures.

2. 2-phenyl-5-[p-(dimethylamino)phenyl] - 1,2,3,4,5,6-hexaazapentalene.
3. A dinitro derivative of the compound of claim 2.
4. A tetranitro derivative of the compound of claim 2.
5. 2-phenyl-4-amino-5-azido-2H-triazole.

References Cited by the Examiner
UNITED STATES PATENTS

Re. 25,238   9/62   Carboni _____ 260—308

OTHER REFERENCES

Elderfield, Heterocyclic Compounds, vol. 7 (New York, 1962), pages 391 and 394–399.

Thiele et al., Liebig's Ann., vol. 295, pages 132 and 150–4 (1897).

NICHOLAS S. RIZZO, *Primary Examiner.*

WALTER A. MODANCE, *Examiner.*